United States Patent
Yuan et al.

(10) Patent No.: US 11,876,367 B2
(45) Date of Patent: Jan. 16, 2024

(54) MODULARIZED DC INTERCONNECTION DEVICE AND SYSTEM THEREOF

(71) Applicant: ABB Schweiz AG, Baden (CH)

(72) Inventors: Chunming Yuan, Beijing (CN); Xiaobo Yang, Beijing (CN); Xing Huang, Beijing (CN)

(73) Assignee: ABB SCHWEIZ AG, Baden (CH)

( * ) Notice: Subject to any disclaimer, the term of this patent is extended or adjusted under 35 U.S.C. 154(b) by 87 days.

(21) Appl. No.: 17/433,954

(22) PCT Filed: Mar. 27, 2019

(86) PCT No.: PCT/CN2019/079852
§ 371 (c)(1),
(2) Date: Aug. 25, 2021

(87) PCT Pub. No.: WO2020/191652
PCT Pub. Date: Oct. 1, 2020

(65) Prior Publication Data
US 2022/0149617 A1 May 12, 2022

(51) Int. Cl.
*H02J 1/00* (2006.01)

(52) U.S. Cl.
CPC .................................. *H02J 1/00* (2013.01)

(58) Field of Classification Search
CPC .. H02H 3/087; H01H 9/542; H01H 2009/543; H01H 33/596; H02J 1/00; H02J 1/08; H02J 1/084; H02J 13/00004
See application file for complete search history.

(56) References Cited

U.S. PATENT DOCUMENTS 10,432,109 B2   10/2019  Alvarez Valenzuela et al.
2014/0022680 A1*  1/2014  Berggren ............... H02H 7/268
                                                                    361/87

(Continued)

FOREIGN PATENT DOCUMENTS

CN   207426678 U    5/2018
EP   2 983 280 A1   2/2016

(Continued)

OTHER PUBLICATIONS

Extended European Search Report; issued by the European Patent Office; regarding corresponding patent application Serial No. EP 19922031.0; dated Oct. 21, 2022; 7 pages.

(Continued)

*Primary Examiner* — Rexford N Barnie
*Assistant Examiner* — Rasem Mourad
(74) *Attorney, Agent, or Firm* — Greenberg Traurig, LLP

(57) ABSTRACT

Embodiments of a modular direct current interconnection device (MDCID) include at least three operation branches, at least one transient branch, and a local controller. Each of the operation branches includes a first terminal coupled to a common node and configured to transmit DC current in a normal mode. The transient branch is coupled between second terminals of different ones of the at least three operation branches and configured to provide a transient DC current path in a fault clearance mode. The local controller is coupled to the operation branches and the transient branch, and the local controller is configured to control operation of the operation branches and the transient branch.

14 Claims, 6 Drawing Sheets

(56) References Cited

U.S. PATENT DOCUMENTS

| | | |
|---|---|---|
| 2014/0347898 A1 | 11/2014 | Raju et al. |
| 2019/0006838 A1* | 1/2019 | Tang .................... H03K 17/162 |
| 2019/0028038 A1 | 1/2019 | Alvarez Valenzuela et al. |

FOREIGN PATENT DOCUMENTS

| | | | |
|---|---|---|---|
| EP | 3300240 A1 | 3/2018 | |
| EP | 3 379 670 A1 | 9/2018 | |
| EP | 3672005 A1 * | 6/2020 | ............... H02H 3/00 |
| JP | 2016-167406 A | 9/2016 | |
| JP | 2016167406 A * | 9/2016 | |
| WO | 2017080597 A1 | 5/2017 | |
| WO | 2019/035180 A1 | 2/2019 | |

OTHER PUBLICATIONS

Liu Guowei, et al.; "Application Framework of VSC Medium-voltage DC Distribution Technology in Shenzhen Power Grid," (Shenzhen Power Supply Co. Ltd., Shenzhen, Guangdong 518048, China; Department of Electrical Engineering, Tasinghua University, Beijing 100084, China); Southern Power System Technology, 2015, vol. 9, No. 9.; 10 pages. (English Abstract).

HE Junjia, et al.; "Review of DC Circuit Breaker Technology Development," (State Key Laboratory of Advanced Electromagnetic Engineering and Technology, Huazhong University of Science and Technology, Wuhan 430074, China); Southern Power System Technology, 2015, vol. 9, No. 2. 7 pages. (English Abstract).

Wei Xiaoguang, et al.; "Technical Development and Engineering Applications of HVDC Circuit Breaker," (Beijing Key Laboratory of DC Grid Technology and Simulation (Global Energy Interconnection Research Institute), Changping District, Beijing 102209, China; State Key Laboratory of Advanced Power Transmission Technology (Global Energy Internconnection Research Institute), Changping District, Beijing 102209, China); Power System Technology; Oct. 2017,vol. 41, No. 10. 9 pages. (English Abstract).

International Search Report and Written Opinion, related to corresponding patent application Serial No. PCT/CN2019/079852; dated Jan. 6, 2020. 8 pages.

* cited by examiner

MODULARIZED DC INTERCONNECTION DEVICE AND SYSTEM THEREOF

CROSS REFERENCE TO RELATED APPLICATIONS

This application is a U.S. National Phase of International Application No. PCT/CN2019/079852, filed Mar. 27, 2019, the disclosure of which is incorporated herein by reference in its entirety.

TECHNICAL FIELD

Example embodiments of the present disclosure generally relate to electrical devices and systems, and more particularly, to modularized direct current (DC) interconnection device and system.

BACKGROUND

Electrical network is generally constituted by various power sources and transmission lines, and electricity is transmitted over the electrical network and consumed by loads accessing the electrical network.

A global controlling center of the electrical network monitors operation of the electrical network or receives information of condition of the electrical network such that the controlling center may control electricity distribution over the electrical network. For example, the global controlling center may control the electrical network to direct electricity to a place where electrical power is insufficient.

A feeder is widely used in such an electrical network, especially in a mediate voltage system, and comprises an alternating current interconnection device and/or a DC interconnection device. In case of feeder fault, the DC interconnection deice of the feeder needs to be disconnected from DC interconnection devices of other feeders. CN207426678U describes a conventional DC interconnection device. However, DC interconnection devices in conventional approaches are relatively expensive in cost and occupy a relatively large footprint.

SUMMARY

In view of the above, the present disclosure herein relates to a modular direct current interconnection device (MDCID) of lower cost. Example embodiments of the present disclosure propose a solution for interconnecting feeders in the electrical network.

In a first aspect, example embodiments of the present disclosure provide a MDCID. The MDCID comprises at least three operation branches, at least one transient branch and a local controller. The at least three operation branches each includes a first terminal coupled to a common node and configured to transmit DC current in a normal mode. The at least one transient branch is coupled between second terminals of different ones of the at least three operation branches and configured to provide a transient DC current path in a fault clearance mode. The local controller is coupled to the at least three operation branches and the at least one transient branch and configured to control operation of the at least three operation branches and the at least one transient branch.

In some embodiments, the local controller is further configured to receive fault clearance information and determine operation and transient branches associated with fault clearance operation in the fault clearance mode based on the received fault clearance information.

In some embodiments, the operation branch comprises a mechanical switch and/or an auxiliary breaker serially coupled with the mechanical switch. The transient branch comprises a main breaker and an energy absorption device coupled in parallel to the main breaker.

In some embodiments, the local controller is further configured to turn on the main breaker in the determined transient branch to provide the transient DC current path in the fault clearance mode, turn off the mechanical switch and the auxiliary breaker in the determined operation branch in response to turning on main breaker, and turn off the main breaker in the determined transient branch in response to completing the turning-off of the mechanical switch, and cause the energy absorption device in the determined transient branch to absorb electric energy in response to turning off the main breaker.

In some embodiments, the at least three operation branches comprise a first operation branch, a second operation branch and a third operation branch. The first operation branch includes a first terminal coupled to the common node. The second operation branch includes a first terminal coupled to the common node. The third operation branch includes a first terminal coupled to the common node. The at least one transient branch comprises a first transient branch coupled between second terminals of the first operation branch and the second operation branch.

In some embodiments, the local controller is further configured to turn on the first transient branch to transmit DC current, turn off the first operation branch in response to turning on the first transient branch; and turn off the first transient branch in response to completing the turning-off of the first operation branch.

In some embodiments, the at least three operation branches comprise a first operation branch, a second operation branch and a third operation branch. The first operation branch includes a first terminal coupled to the common node. The second operation branch includes a first terminal coupled to the common node. The third operation branch includes a first terminal coupled to the common node. The at least one transient branch comprises a first transient branch coupled between second terminals of the first operation branch and the second operation branch, and a second transient branch coupled between second terminals of the second operation branch and the third operation branch.

In some embodiments, the local controller is further configured to turn on the first transient branch to transmit DC current, turn off the first operation branch in response to turning on the first transient branch; and turn off the first transient branch in response to completing the turning-off of the first operation branch.

In some embodiments, the local controller is further configured to turn on at least one of the first and second transient branches to transmit DC current, turn off the second operation branch in response to turning on the at least one of the first and second transient branches, and turn off the at least one of the first and second transient branches in response to completing the turning-off of the second operation branch.

In some embodiments, the at least three operation branches comprise a first operation branch, a second operation branch, a third operation branch and a fourth operation branch. The first operation branch includes a first terminal coupled to the common node. The second operation branch includes a first terminal coupled to the common node. The third operation branch includes a first terminal coupled to the common node. The fourth operation branch includes a first terminal coupled to the common node. The at least one transient branch comprises a first transient branch coupled between second terminals of the first operation branch and the second operation branch, and a second transient branch coupled between second terminals of the third operation branch and the fourth operation branch.

In some embodiments, the at least three operation branches comprise a first operation branch, a second operation branch, a third operation branch, a fourth operation branch and a fifth operation branch. The first operation branch includes a first terminal coupled to the common node. The second operation branch includes a first terminal coupled to the common node. The third operation branch includes a first terminal coupled to the common node. The fourth operation branch includes a first terminal coupled to the common node. The fifth operation branch includes a first terminal coupled to the common node. The at least one transient branch comprises a first transient branch, a second transient branch, and a third transient branch. The first transient branch is coupled between second terminals of the first operation branch and the second operation branch. The second transient branch is coupled between second terminals of the second operation branch and the third operation branch. The third transient branch is coupled between second terminals of the fourth operation branch and the fifth operation branch.

In some embodiments, the main breaker comprises a plurality of insulated gate bipolar transistors (IGBTs) coupled in series.

In some embodiments, completing the turning-off of the mechanical switch comprises separating first and second contacts of the mechanical switch by a predetermined distance.

In some embodiments, number of the at least one transient branch is not greater than half of a sum of number of the at least three operation branches and one.

In a second aspect, example embodiments of the present disclosure provide an electrical network system. The system comprises a first interconnection device, a second interconnection device, a third interconnection device and a global controller. The first interconnection device includes a modular DC interconnection device of the first aspect. The second interconnection device includes a modular DC interconnection device of the first aspect and is selectively coupled to the first interconnection device. The third interconnection device includes a modular DC interconnection device of the first aspect. The third interconnection device is selectively coupled to the first and second interconnection devices, and is configured to transmit DC current among the first, second and third interconnection devices. The global controller is configured to communicate with local controllers of the first, second and third interconnection devices.

In some embodiments, the local controller in the modular DC interconnection device of the first interconnection device is configured to receive fault clearance information and determine operation and transient branches associated with fault clearance operation in the fault clearance mode based on the received fault clearance information.

In some embodiments, the operation branch comprises a mechanical switch and/or an auxiliary breaker serially coupled with the mechanical switch. The transient branch comprises a main breaker and an energy absorption device coupled in parallel to the main breaker.

In some embodiments, the local controller is further configured to turn on the main breaker in the determined transient branch to provide the transient DC current path in the fault clearance mode, turn off the mechanical switch and the auxiliary breaker in the determined operation branch in response to turning on main breaker, and turn off the main breaker in the determined transient branch in response to completing the turning-off of the mechanical switch; and cause the energy absorption device in the determined transient branch to absorb electric energy in response to turning off the main breaker.

In some embodiments, the at least three operation branches in the modular DC interconnection device of the first interconnection device comprise a first operation branch, a second operation branch and a third operation branch. The first operation branch includes a first terminal coupled to the common node. The second operation branch includes a first terminal coupled to the common node. The third operation branch includes a first terminal coupled to the common node. The at least one transient branch in the modular DC interconnection device of the first interconnection device comprises a first transient branch coupled between second terminals of the first operation branch and the second operation branch.

In some embodiments, the local controller in the modular DC interconnection device of the first interconnection device is further configured to turn on the first transient branch to transmit DC current, turn off the first operation branch in response to turning on the first transient branch; and turn off the first transient branch in response to completing the turning-off of the first operation branch.

According to the embodiments of the present disclosure, the electrical network system may be easily configured, and reliability of the electrical network system may be improved by utilizing the modular interconnection device.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

Figure 1:
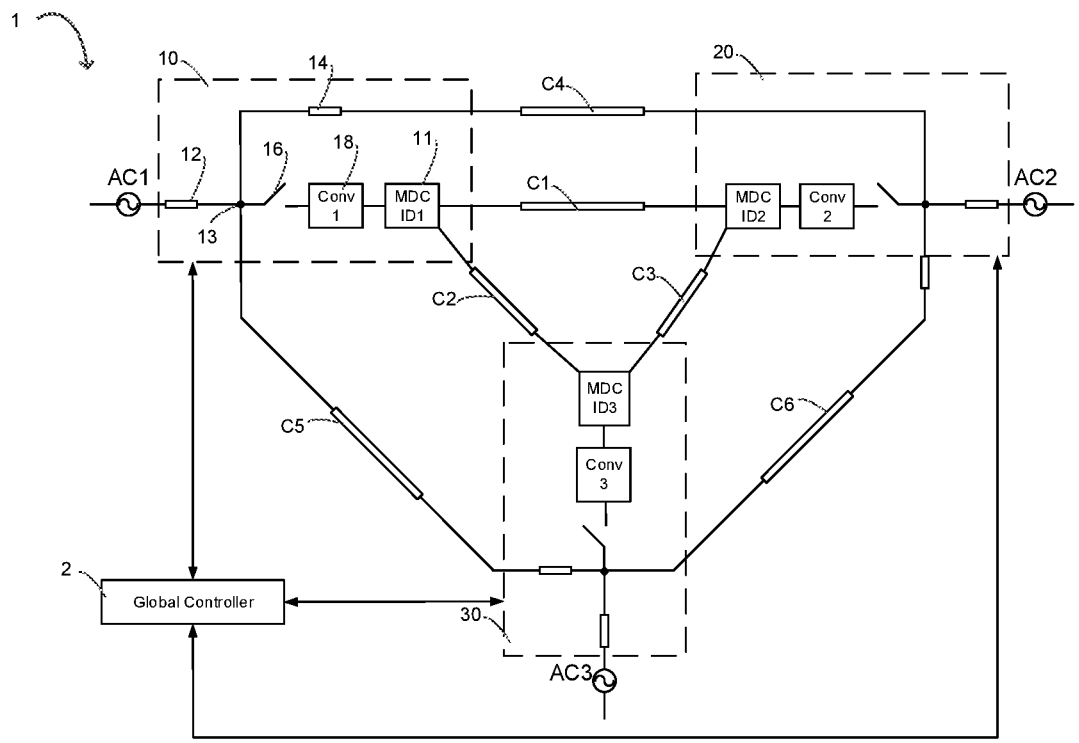
FIG. 1 illustrates a block diagram of an electrical network system in accordance with some example embodiments of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

As mentioned above, conventional electrical network system may include significant amount of feeders including MDCIDs, and conventional MDCIDs are expensive in cost and contribute greatly to the overall cost. Thus, it is desired to reduce cost of the MDCID and the conventional electrical network system.

FIG. 1 illustrates a block diagram of an electrical network system 1 in accordance with some example embodiments of the present disclosure. The electrical network system 1 includes a first modular interconnection device (MID) 10, a second MID 20 and a third MID 30 electrically coupled to each other. The term "modular interconnection device" herein refers to an interconnection device that has a similar or same architecture including a port assembly achieving similar or same interconnecting function, and can be coupled to and replaced by each other. The term "local controller" herein refers to the controller in the MID device, instead of a global controller commonly shared by the conventional electrical network system.

The MID 10 may couple to an AC power supply AC1. Although each MID in FIG. 1 is illustrated to couple to an AC power supply, this is only for illustration without suggesting any limitations as to the scope of the subject matter described here. For example, a MID may share an AC power supply via another MID. In an example, the MID 20 in FIG. 1 may disconnect from the power supply AC2, and shares the power supply AC1 with MID1.

The electrical network system 1 includes a global controller 2. The global controller 2 may collect information from the plurality of MIDs or other sensing nodes in the electrical network system, and controls operation of the MIDs by transmitting instructions to the MIDs. In case that a further MID is needed in the electrical network system 1, the global controller 2 may control certain MIDs, usually the MIDs to which the further MID will be coupled, to temporarily disable, and enable the disabled MIDs and the further MIDs upon successfully coupling the further MID to the disabled MIDs.

In case that a MID is needed to be removed from the electrical network system 1, the global controller 2 may control certain MIDs, usually the MIDs to which the MID is being coupled, to temporarily disable, and enable the disabled MIDs upon successfully coupling the disabled MIDs and/or incorporating a new MID. In case that the global controller 2 fails or loses communication with the MIDs, at least one controller in the MIDs may operates a temporary host controller, and other controllers may communicate with the host controller for proper operation of the electrical network system 1.

The MID 10 includes a first switch 12 coupled to the AC power supply AC1, a normally-open-point (NOP) switch 14, a local common node 13, a second switch 16, a DC-AC converter 18 and a MDCID 11. The local common node 13 is coupled to all of the first switch 12, the NOP switch 14, the second switch 16 and a branch coupled to another MID, e.g., MID 30, via a cable C5. The DC-AC converter 18 is configured to convert AC current into DC current, or convert DC current to AC current, as needed. The MDCID 11 is coupled to MDCIDs of the MIDs 20 and 30 via cables C1 and C2, respectively, and configured to selectively flow DC current among the MIDs 10, 20 and 30.

Figure 2:
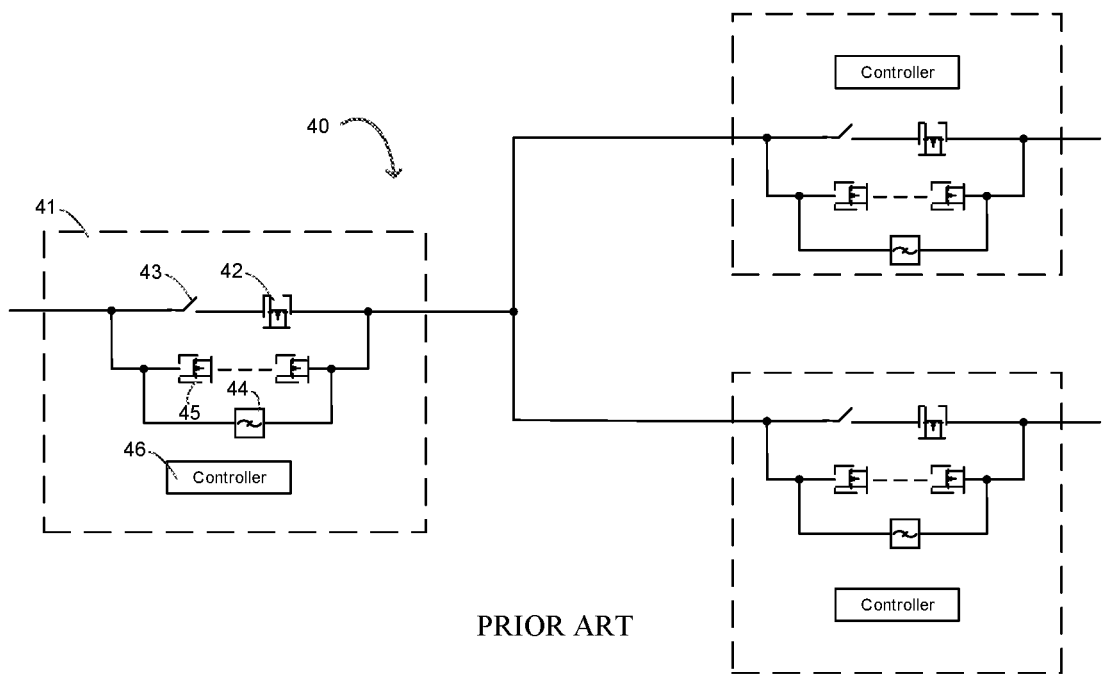
FIG. 2 illustrates a block diagram of a conventional MDCID.

FIG. 2 illustrates a block diagram of a conventional MDCID 40. The MDCID is generally a three-terminal device. This is only for illustration without suggesting any limitations as to the scope of the subject matter described here. MDCID of more terminals, such as a four-terminal MDCID or a five-terminal MDCID, may be employed in some configurations, as set forth below.

The MDCID 40 includes a first terminal coupled to the converter 18 of FIG. 1, a second terminal coupled to the MDCID 20 of FIG. 1 via a first cable C1, and a third terminal coupled to the MDCID 30 of FIG. 1 via a second cable C2. The MDCID 40 includes three switch units coupled between a respective terminal and a common node. The three switch unit is substantially the same, and the first switch unit 41 is described for illustration.

The first switch unit 41 includes an operation branch, a transient branch and a local controller 46. The operation branch includes a mechanical switch 43 and an auxiliary breaker 42 serially coupled with the mechanical switch 43. Although the mechanical switch 43 and an auxiliary breaker 42 are illustrated for the operation branch, this is only for illustration without suggesting any limitations as to the scope of the subject matter described here. Other configuration of the operation branch is possible. For example, the operation branch may include a mechanical switch 43 or an auxiliary breaker 42, or more switches or breakers.

The auxiliary breaker 42 may include at least one of solid state switches, such as semiconductor switches, to provide quick break of the circuit. The operation branch is configured to transmit DC current in normal operation mode. The term "normal operation mode" refers to a mode that the electrical system including the MDCID normally operates without requirement of fault clearance.

The transient branch includes a main breaker 45 and an energy absorption device 44. The main breaker 45 may include a serial of solid-state switches, such as insulated gate bipolar transistors (IGBTs). The main breaker 45 is designed based on performance requirement, and thus the number of IGBTs and their corresponding footprints are a function of the performance requirement. Although IGBT is illustrated for the transient branch, this is only for illustration without suggesting any limitations as to the scope of the subject matter described here. Other semiconductor switch than can withstand mediate voltage can be applied in the transient branch.

The energy absorption device 44 may be a capacitor or a series of capacitors, for example, and is configured to absorb energy from the transient main breaker 45 when the main breaker 45 is turned off. When main breaker 45 is switched turned off, a large amount of electrical energy may be released from the main breaker 45. Without the energy absorption device 44, the electrical energy may cause damage, such as device breakdown.

The switch unit 41 also includes a local controller 46. The local controller 46 is coupled to the mechanical switch 43, the auxiliary breaker 42, the main breaker 45 and the energy absorption device 44 to control their operation. The local controller 46 is configured to receive information from other local controllers, the global controller 2 or sensors, and determine MDCID's operations based on the received information. In addition, the local controller 46 may also send information to other local controllers, the global controller 2 or sensors.

In the normal operation mode, the transient branch transmits no DC current. When a fault occurs, the MDCID enters a mode of fault clearance. In the fault clearance mode, the MDCID directly associated with the fault may need to be removed from the electrical network, and may be replaced with a new MDCID. During the fault clearance mode, the MDCID, which is determined to be removed, is electrically disconnected with other functional MDCIDs. For example, in case that a fault occurs at the MID 10 including the MDCID 40, the first switch unit 41 may be turned off and the second and third switch units in the MDCID 40 may be maintained to turn on, so as to isolate the MID 10 from the MIDs 20 and 30 without affecting normal DC transmission between the MIDs 20 and 30.

In the configuration of FIG. 2, each switch unit includes a transient branch and an operation branch. This may be expensive in cost, since IGBTs are very expensive and they take a majority of the cost of the MDCID. In addition, each switch unit has a local controller 46 causing three local controllers in the conventional MDCID 40. Three local controllers in a MDCID 40 further increases cost, and increase control complexity. Since IGBTs and controllers are used in each of the three switch units, the MDCID 40 takes a significantly large volume and footprint.

Figure 3:
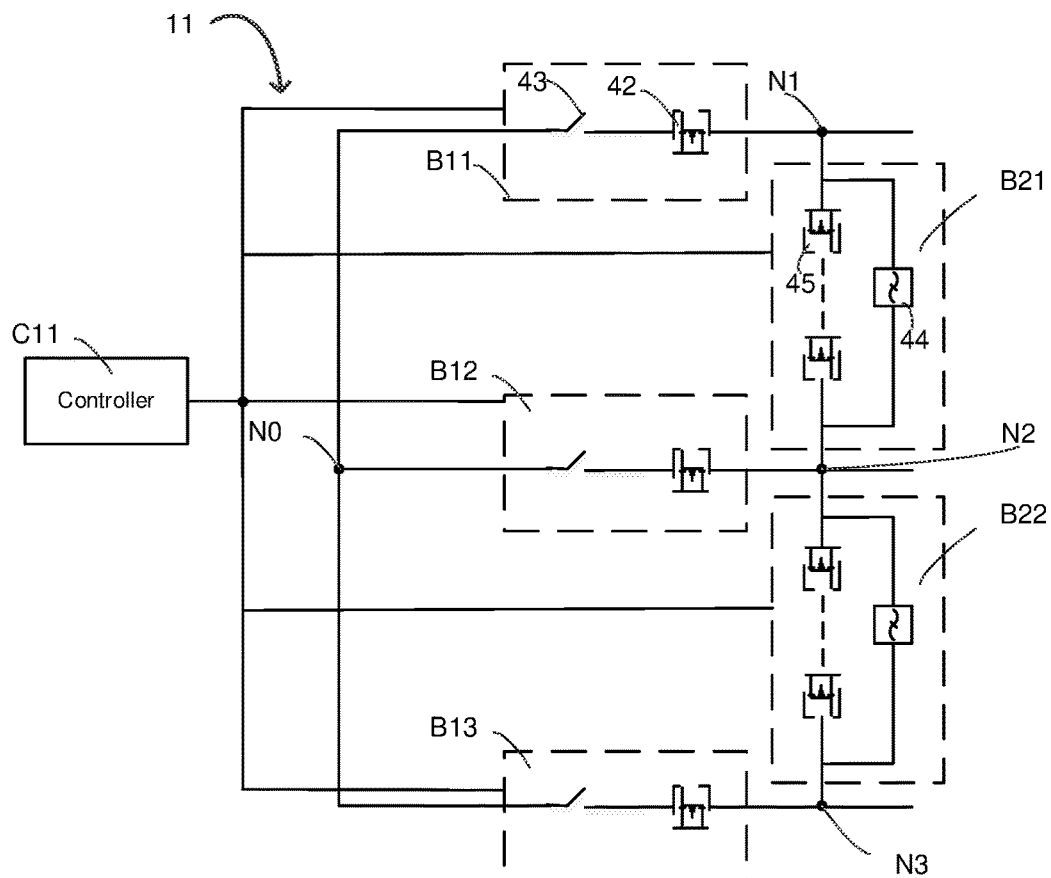
FIG. 3 illustrates a block diagram of a three-terminal MDCID in accordance with some further example embodiments of the present disclosure.

FIG. 3 illustrates a block diagram of a three-terminal MDCID 11 in accordance with some further example embodiments of the present disclosure. The MDCID 11 includes a local controller C11, a first operation branch B11, a second operation branch B12, a third operation branch B12, a first transient branch B21, and a second transient branch B22. Each of the first, second, and third operation branches is similar to the operation branch of FIG. 2, and has its first terminal coupled to a common node N0. The first transient branch B21 is coupled between the second terminals of the first and second operation branches B11 and B12. The second branch B22 is coupled between the second terminals of the second and third operation branches B12 and B13.

The local controller C11 is coupled to the first operation branch B11, the second operation branch B12, the third operation branch B12, the first transient branch B21, and the second transient branch B22 to control their operation. The local controller C11 is configured to receive information from other local controllers, the global controller 2 or sensors, and determine MDCID's operations based on the received information. In addition, the local controller C11 may also send information to other local controllers, the global controller 2 or sensors. By using a single controller C11, the control complexity can be reduced, and cost, footprint and volume of the MDCID 11 can be reduced as compared to the conventional MDCID 40.

In case of a fault, the local controller C11 is further configured to receive fault clearance information, e.g., from local controller of another MDCID, the global controller 2 or sensor for sensing a fault in the MID or MDCID. The fault clearance information may include information indicating an occurred fault, its location, and/or MDCID that needs to be removed or replaced. The local controller C11 may determine operation and transient branches associated with fault clearance operation in the fault clearance mode based on the received fault clearance information.

Upon determination, the local controller may turn on the main breaker 45 in the determined transient branch to provide the transient DC current path in the fault clearance mode, turn off the mechanical switch 43 and the auxiliary breaker 42 in the determined operation branch in response to turning on main breaker 45, and turn off the main breaker 45 in the determined transient branch in response to completing the turning-off of the mechanical switch; and cause the energy absorption device 44 in the determined transient branch to absorb electric energy in response to turning off the main breaker.

For example, in case that the fault occurs at the first terminal connecting to the node N1, the first terminal needs to be isolated from other terminals of the MDCID 11 in the fault clearance mode. The local controller C11 turns on the first transient branch B21 to create a DC path for the first terminal, and then turns off the first operation branch B11. Upon the first operation branch B11 is completely turned off, the local controller C11 turns off the first transient branch B21, such that the first terminal is isolated from the second and third terminals without breaking normal DC transmission between the second and third terminals.

Specifically, the local controller C11 turn on the main breaker in the first transient branch B21 to provide the transient DC current paths in the fault clearance mode, turn off the mechanical switch and the auxiliary breaker in the determined operation branches (the first operation branch B11 in this example) in response to turning on main breaker, and turn off the main breaker in the first transient branch B21 in response to completing the turning-off of the mechanical switch, and cause the energy absorption device in the transient branch B21 to absorb electric energy in response to turning off the main breaker. Hereinafter, turning-on of a transient branch refers to turn on main breaker of the transient branch, and turning-off of a transient branch refers to turn off the main breaker and cause the energy absorption device to absorb electric energy in response to turning off the main breaker.

The mechanical switch generally includes first and second contacts. In case that they are physically contacted, the mechanical switch may normally conduct DC current. When the mechanical switch needs to turn off, the first and second contacts needs to be separated by a predetermined distance for security. Below the predetermined distance, there is a possibility that the DC current may break down. This separation often takes some time. In this case, completing the turning-off of the mechanical switch includes separating first and second contacts of the mechanical switch by a predetermined distance. The term "completing turning-off" hereinafter refers to separating first and second contacts of the mechanical switch by a predetermined distance.

In case that the fault occurs at the second terminal connecting to the node N2, the second terminal needs to be isolated from other terminals of the MDCID 11 in the fault clearance mode. The local controller C11 turns on at least one of the first and second transient branches B21 and B22 to create a DC path for the second terminal, and then turns off the second operation branch B12. Upon the second operation branch B12 is completely turned off, the local controller C11 turns off the at least one of the first and second transient branches B21 and B22, such that the second terminal is isolated from the first and third terminals without breaking normal DC transmission between the first and third terminals.

Scenario of a fault occurring at the third terminal is equivalent to the scenario of a fault occurring at the first terminal. The description for this scenario is omitted here for brevity. As compared to the conventional MDCID 40, the MDCID 11 has less transient branches. This significantly reduces cost, volume and footprint of the MDCID. In addition, less transient branches would further simplify local controller's control complexity and increase reliability of the MDCID.

Figure 4:
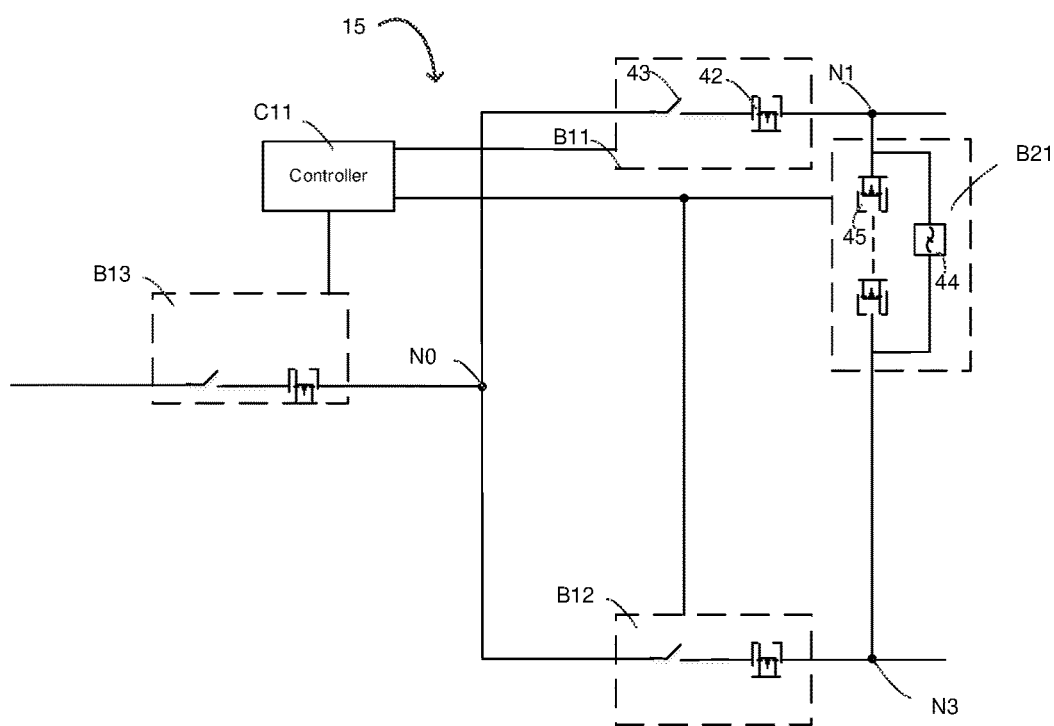
FIG. 4 illustrates a block diagram of a three-terminal MDCID in accordance with some further example embodiments of the present disclosure.

FIG. 4 illustrates a block diagram of a three-terminal MDCID 15 in accordance with some further example embodiments of the present disclosure. In some scenarios, faults occur near or at local stations, and can be removed right away. In this case, the configuration of FIG. 3 can be further simplified in FIG. 4.

The MDCID 15 includes a local controller C11, a first operation branch B11, a second operation branch B12, a third operation branch B12 and a first transient branch B21. The local controller C11 is coupled to the first operation branch B11, the second operation branch B12, the third operation branch B12, and the first transient branch B21 to control their operation. By using one transient branch B21, the control complexity can be reduced, and cost, footprint and volume of the MDCID 15 can be reduced as compared to the conventional MDCID 11.

In case that the fault occurs at the first terminal connecting to the node N1, the first terminal needs to be isolated from other terminals of the MDCID 11 in the fault clearance mode. The local controller C11 turns on the first transient branch B21 to create a DC path for the first terminal, and then turns off the first operation branch B11. Upon the first operation branch B11 is completely turned off, the local controller C11 turns off the first transient branch B21, such that the first terminal is isolated from the second and third terminals without breaking normal DC transmission between the second and third terminals.

In case that the fault occurs at the second terminal connecting to the node N2, the second terminal needs to be isolated from other terminals of the MDCID 11 in the fault clearance mode. The fault at the second terminal can be removed at local station right away. In this case, no transient branch is needed for the second terminal. This would further reduce cost, volume and footprint of MDCID, and local controller's control complexity, as compared to the configuration of FIG. 3, since less transient branch is employed.

Figure 5:
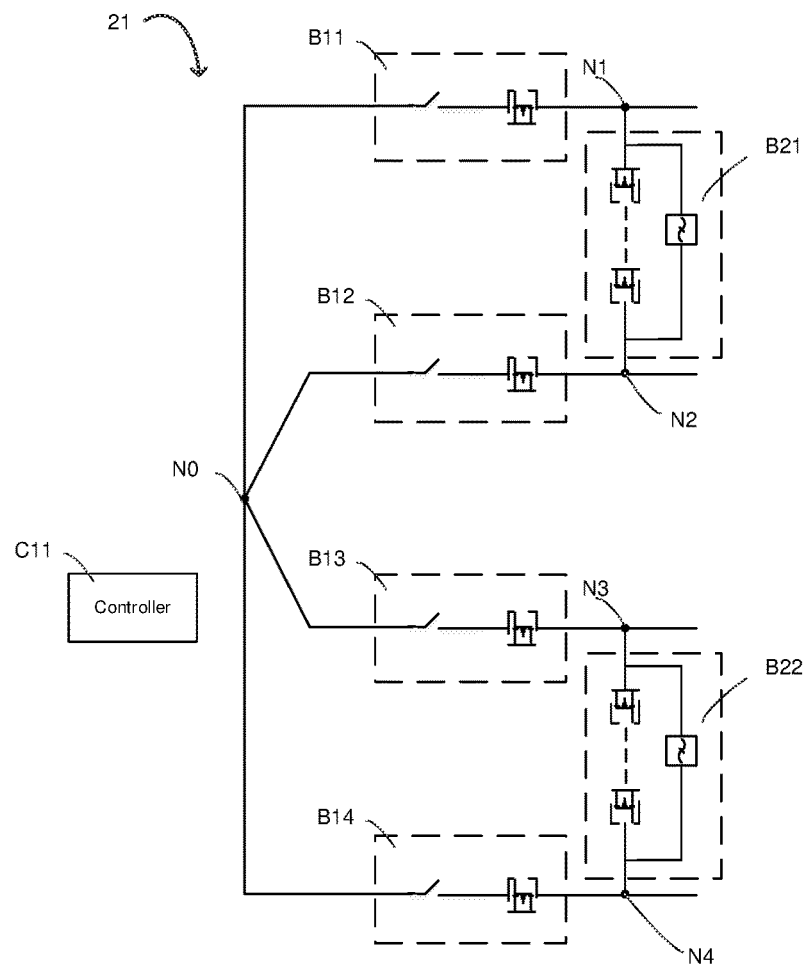
FIG. 5 illustrates a block diagram of a four-terminal MDCID in accordance with some example embodiments of the present disclosure.

FIG. 5 illustrates a block diagram of a four-terminal MDCID 21 in accordance with some example embodiments of the present disclosure. The MDCID 21 can be applied to an environment of four feeders. The MDCID 21 includes a local controller C11, a first operation branch B11, a second operation branch B12, a third operation branch B12, a fourth branch B14, a first transient branch B21, and a second transient branch B22. Each of the first, second, third and fourth operation branches are similar to the operation branch of FIG. 2, and has its first terminal coupled to a common node N0. The first transient branch B21 is coupled between the second terminals of the first and second operation branch B11 and B12. The second transient branch B22 is coupled between the second terminals of the third and fourth operation branches B13 and B14.

The local controller C11 is coupled to (not shown for clarity) the first operation branch B11, the second operation branch B12, the third operation branch B12, the fourth operation branch B14, the first transient branch B21, and the second transient branch B22 to control their operation. By using a single controller C11, the control complexity can be reduced, and cost, footprint and volume of the MDCID 21 can be reduced as compared to the conventional four-terminal MDCID.

In case of a fault, the local controller C11 is further configured to receive fault clearance information, e.g., from a local controller of another MDCID, the global controller 2 or sensor for sensing a fault in the MID or MDCID. The fault clearance information may include information indicating an occurred fault, its location, and/or MDCID that needs to be removed or replaced. The local controller C11 may determine operation and transient branches associated with fault clearance operation in the fault clearance mode based on the received fault clearance information.

Upon determination, the local controller may turn on the main breaker 45 in the determined transient branch to provide a transient DC current path in the fault clearance mode, turn off the mechanical switch 43 and the auxiliary breaker 42 in the determined operation branch in response to turning on main breaker 45, and turn off the main breaker 45 in the determined transient branch in response to completing the turning-off of the mechanical switch; and cause the energy absorption device 44 in the determined transient branch to absorb electric energy in response to turning off the main breaker.

In case that the fault occurs at the first terminal connecting to the node N1, the first terminal needs to be isolated from other terminals of the MDCID 11 in the fault clearance mode. The local controller C11 turns on the first transient branch B21 to create a DC path for the first terminal, and then turns off the first operation branch B11. Upon the first operation branch B11 is completely turned off, the local controller C11 turns off the first transient branch B21, such that the first terminal is isolated from the second and third terminals without breaking normal DC transmission between the second and third terminals.

Scenario of a fault occurring at the second, third and fourth terminal is equivalent to the scenario of a fault occurring at the first terminal. The description for this scenario is omitted here for brevity.

As compared to the conventional MDCID 40, the MDCID 21 has less transient branches. This significantly reduces cost, volume and footprint of the MDCID due to the fact that less semiconductor switches of high cost are used. In addition, less transient branches would further simplify local controller's control complexity and increase reliability of the MDCID. Generally, according to embodiments of the present disclosure, number of the at least one transient branch is not greater than half of a sum of number of the at least three operation branches and one. For example, in a configuration of three-terminal MDCID, the number of transient branches can be not greater than two, and in a configuration of four-terminal MDCID, the number of transient branches can be not greater than two.

Figure 6:
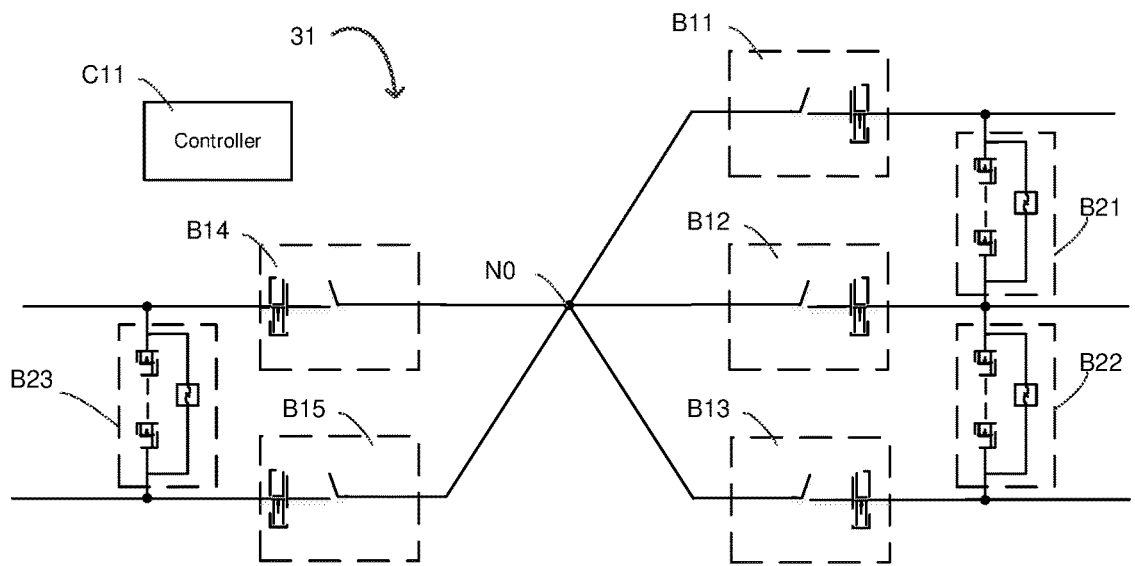
FIG. 6 illustrates a block diagram of a five-terminal MDCID in accordance with some example embodiments of the present disclosure.

FIG. 6 illustrates a block diagram of a five-terminal MDCID 31 in accordance with some example embodiments of the present disclosure. The five-terminal MDCID 31 may have a star configuration similar to the configurations of FIGS. 3-5. The star configuration has a common node N0 shared by the first terminals of all the operation branches. The second terminals of all the operation branches are coupled to at least one transient branch.

The right part of the configuration of FIG. 6 is similar to the configuration of FIG. 3, and its operation is similar to that of the configuration of FIG. 3. In case that a fault occurs at the first terminal connecting to the first operation branch B11, the local controller C11 turns on the first transient branch B21, and then start to turn off the first operation branch B11. The DC current flows through the transient branch B21 and the operation branch B12, and flow through the third, fourth and fifth operation branches. Once the first operation branch B11 is completely turned off, the local controller C11 turns off the first transient branch B21, such that the fault occurred at the first terminal can be cleared.

In case that a fault occurs at the second terminal connecting to the second operation branch B21, the local controller C11 turns on at least one of the first and second transient branches B21 and B22, and then start to turn off the second operation branch B12. The DC current flows through the at least one of the first and second transient branches B21 and B22 and at least one of the first and third operation branches B11 and B13, and flow through the fourth and fifth operation branches. Once the second operation branch B12 is completely turned off, the local controller C11 turns off the at least one of the first and second transient branches B21 and B22, such that the fault occurred at the second terminal can be cleared.

In case that a fault occurs at the fourth terminal connecting to the fourth operation branch B14, the local controller C11 turns on the third transient branch B23, and then start to turn off the fourth operation branch B14. The DC current flows through the third transient branch B23 and the fifth operation branch B15, and flow through the first, second and third operation branches. Once the fourth operation branch B14 is completely turned off, the local controller C11 turns off the third transient branch B23, such that the fault occurred at the fourth terminal can be cleared.

Scenarios for faults occurring at the third terminal and fifth terminal are similar to the scenarios for faults occurring at the first terminal and fourth terminal respectively due to symmetric topology. Thus, operations for the scenarios for faults occurring at the third terminal and fifth terminal are omitted here for brevity.

With the configuration of FIG. 6, number of the transient branches can be reduced by two, as compared to conventional five-terminal MDCID having five transient branches. It can be understood that MDCIDs of more terminals can analogously reduce transient branches, as long as the transient branches are shared by the operation branches. For example, for configuration with N operation branches, it can have transient branches not greater than (N+1)/2, in which N represents an integer number of more than two.

Figure 7:
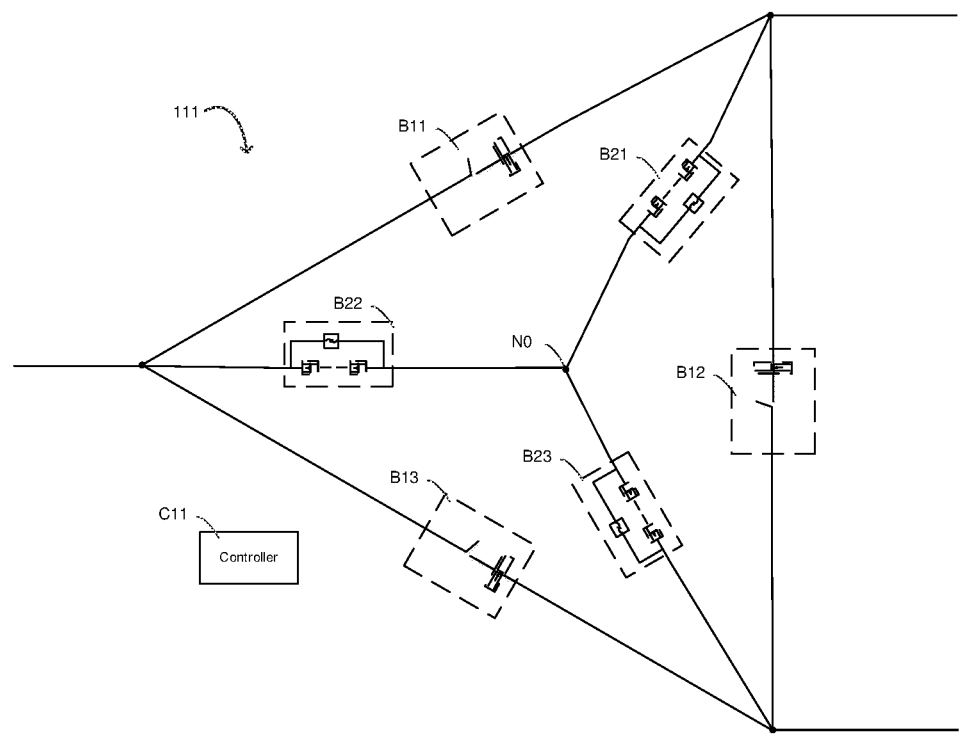
FIG. 7 illustrates a block diagram of a three-terminal MDCID in accordance with some example embodiments of the present disclosure.

FIG. 7 illustrates a block diagram of a three-terminal MDCID 111 in accordance with some example embodiments of the present disclosure. The MDCID 111 includes a first operation branch B11, a second operation branch B12, a third operation branch B13, a first transient branch B21, a second transient branch B22, a third transient branch B23 and a local controller C11. The MDCID 111 has a circular configuration with three operation branches connecting in a circle, and has a star configuration with transient branches coupling between a common node N0 and a node between two operation branches.

The local controller C11 is coupled to (not shown for clarity) the first operation branch B11, the second operation branch B12, the third operation branch B12, the first transient branch B21, the second transient branch B22 and the third transient branch B23 to control their operation. By using a single controller C11, the control complexity can be reduced, and cost, footprint and volume of the MDCID 11 can be reduced as compared to the conventional MDCID 40.

In case that a fault occurring at first terminal between the first and third operation branches, the local controller C11 turns on the transient branches B22 and B23, and then starts to turn off the operation branches B11 and B13, in succession or simultaneously. Upon completing turning-off of the operation branches B11 and B13, the local controller C11 turns off the transient branches B22 and B23. Scenarios of faults occurring at the second and third terminals are similar to the scenario of fault occurring at the first terminal due to symmetric topology, and the description is omitted here for brevity.

Specifically, the local controller C11 turn on the main breakers in the transient branches B22 and B23 to provide the transient DC current paths in the fault clearance mode, turn off the mechanical switches and the auxiliary breakers in the determined operation branches in response to turning on main breakers, and turn off the main breakers in the transient branches in response to completing the turning-off of the mechanical switches, and cause the energy absorption devices in the transient branches B22 and B23 to absorb electric energy in response to turning off the main breakers.

Due to the fact that two transient branches in series are employed for a fault at a terminal, main breakers and energy absorption devices in each transient branch can selected from main breakers and energy absorption devices of half performance requirement, as compared to the transient branch in conventional MDCIDs. In other words, operation of the single transient branch in conventional MDCID is shared by two transient branches in configuration of FIG. 7. In this event, the transient branch in FIG. 7 is actually "half" of the transient branch in FIG. 2.

For example, the number of serially connected IGBTs in main breaker of a transient branch of FIG. 7 may be the half of the number of the serially connected IGBTs in main breaker of a transient branch of FIG. 2. In addition, capacitance of a capacitor in the energy absorption device of a transient branch of FIG. 7 may be the half of capacitance of a capacitor in the energy absorption device of a transient branch of FIG. 2. In other words, less IGBTs and capacitors would be used in the MDCIDs of FIG. 7. This significantly reduces cost, volume and footprint, as compared to conventional approaches.

Figure 8:
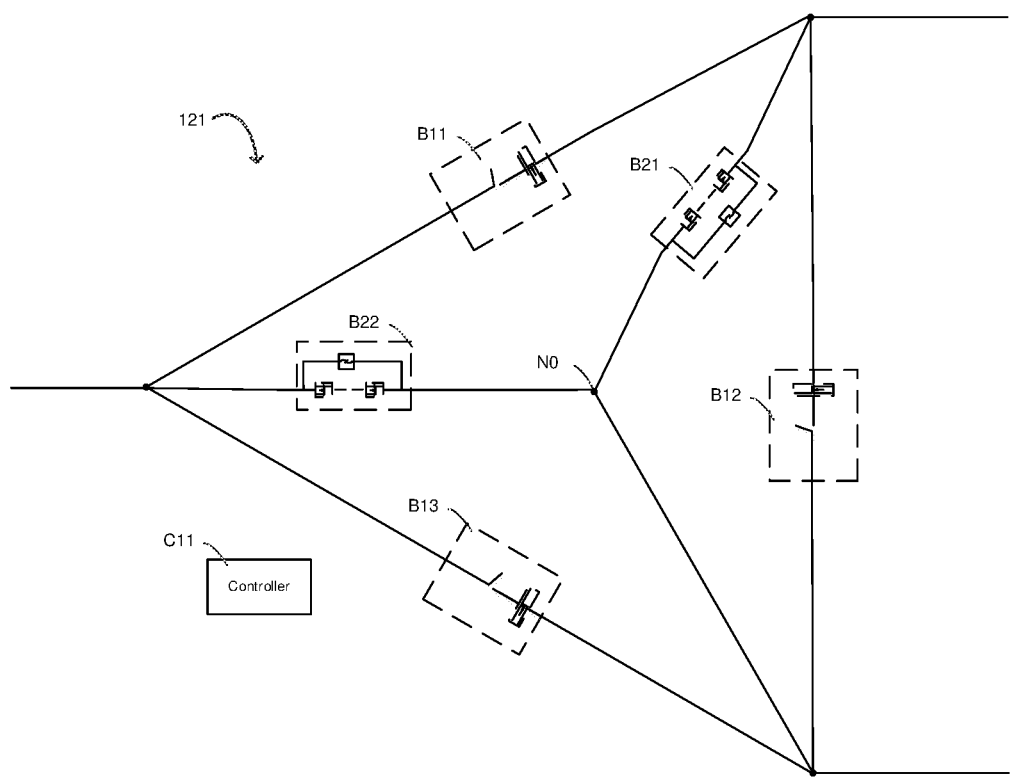
FIG. 8 illustrates a block diagram of a three-terminal MDCID in accordance with some example embodiments of the present disclosure.

FIG. 8 illustrates a block diagram of a three-terminal MDCID 121 in accordance with some example embodiments of the present disclosure. In some scenarios, faults occur near or at local stations, and can be removed right away. In this application, the configuration of FIG. 7 can be further simplified in FIG. 8.

The MDCID 121 includes a local controller C11, a first operation branch B11, a second operation branch B12, a third operation branch B12, a first transient branch B21 and a second transient branch B22. The local controller C11 is coupled to (not shown for clarity) the first operation branch B11, the second operation branch B12, the third operation branch B12, the first transient branch B21 and the second transient branch B22 to control their operation.

In case that the fault occurs at the first terminal between the first and third operation branches B11 and B13, the first terminal needs to be isolated from other terminals of the MDCID 121 in the fault clearance mode. The local controller C11 turns on the second transient branch B22 to create a DC path for the first terminal, and then turns off the first and third operation branches B11 and B13, in succession or simultaneously. Upon the first and third operation branches B11 and B13 are completely turned off, the local controller C11 turns off the second transient branch B22, such that the first terminal is isolated from the second and third terminals without breaking normal DC transmission between the second and third terminals.

In case that the fault occurs at the second terminal between the second and third operation branches B12 and B13, the second terminal needs to be isolated from other terminals of the MDCID 121 in the fault clearance mode. The local controller C11 turns on the second transient branch B22 to create a DC path for the second terminal, and then turns off the second and third operation branches B12 and B13, in succession or simultaneously. Upon the second and third operation branches B12 and B13 are completely turned off, the local controller C11 turns off the second transient branch B22, such that the second terminal is isolated from the first and third terminals without breaking normal DC transmission between the second and third terminals. In this case, no transient branch is needed for the second terminal.

Although the second transient branch B22 is used here, this is only for illustration without suggesting any limitations as to the scope of the subject matter described here. The first transient branch B21 can be used, or both the first and second branches B21 and B22 can be used alternatively. Scenario of a fault occurring at the third terminal is similar to the scenario of the fault at the first terminal, and the fault can be cleared in a similar manner. With the configuration of FIG. 8, it could further reduce cost, volume and footprint of MDCID, and local controller's control complexity.

Figure 9:
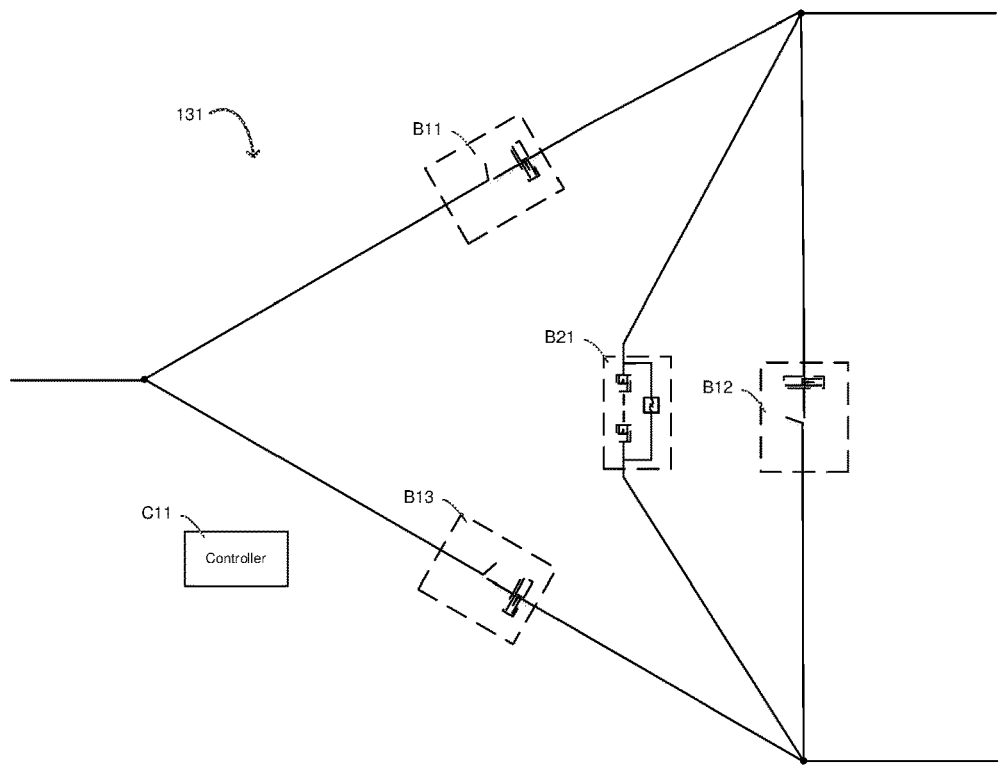
FIG. 9 illustrates a block diagram of a three-terminal MDCID in accordance with some example embodiments of the present disclosure.

FIG. 9 illustrates a block diagram of a three-terminal MDCID 131 in accordance with some example embodiments of the present disclosure. In some scenarios, faults occur near or at local stations, and can be removed right away. In this application, the configuration of FIG. 8 can be further simplified in FIG. 9.

The MDCID 131 includes a local controller C11, a first operation branch B11, a second operation branch B12, a third operation branch B12 and a first transient branch B21. The local controller C11 is coupled to (not shown for clarity) the first operation branch B11, the second operation branch B12, the third operation branch B12, and the first transient branch B21 to control their operation. By using a single transient branch B21, the control complexity can be reduced, and cost, footprint and volume of the MDCID 131 can be reduced as compared to the conventional MDCID 121.

In case that the fault occurs at the first terminal between the first and second operation branches B11 and B12, the first terminal needs to be isolated from other terminals of the MDCID 131 in the fault clearance mode. The local controller C11 turns on the first transient branch B21 to create a DC path for the first terminal, and then turns off the first and second operation branches B11 and B12, in succession or simultaneously. Upon the first and second operation branches B11 and B12 are completely turned off, the local controller C11 turns off the first transient branch B21, such that the first terminal is isolated from the second and third terminals without breaking normal DC transmission between the second and third terminals.

In case that the fault occurs at the second terminal between the first and third operation branches B11 and B13, the second terminal needs to be isolated from other terminals of the MDCID 131 in the fault clearance mode. The fault at the second terminal can be removed at local station right away. In this case, no transient branch is needed for the second terminal. This would further reduce cost, volume and footprint of MDCID, and local controller's control complexity. Due to symmetric topology, the fault occurred at the third terminal between the second and third operation branches B12 and B13 can be cleared in a similar manner as that for the fault at the first terminal.

Figure 10:
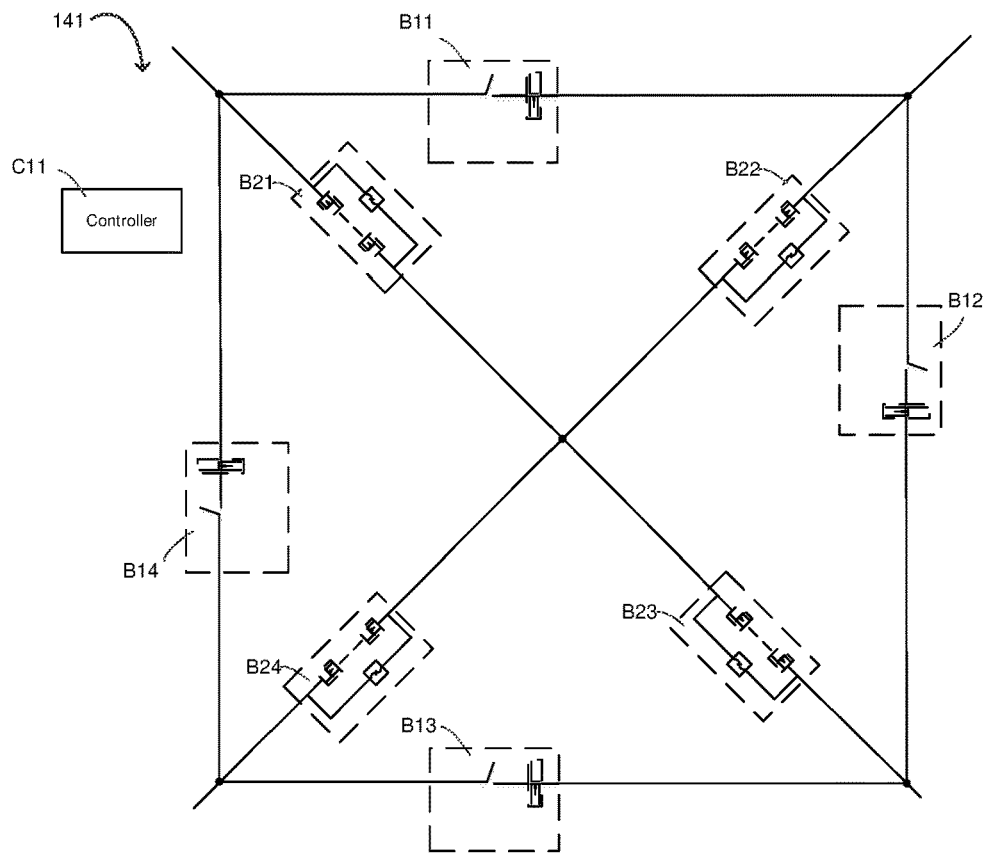
FIG. 10 illustrates a block diagram of a four-terminal MDCID in accordance with some example embodiments of the present disclosure.

FIG. 10 illustrates a block diagram of a four-terminal MDCID 141 in accordance with some example embodiments of the present disclosure. The MDCID 141 includes a first operation branch B11, a second operation branch B12, a third operation branch B13, a fourth operation branch B14, a first transient branch B21, a second transient branch B22, a third transient branch B23, a fourth transient branch B24 and a local controller C11. The MDCID 141 has a circular configuration with three operation branches connecting in a circle, and has a star configuration with transient branches coupling between a common node and a node between two operation branches.

The local controller C11 is coupled to (not shown for clarity) the first operation branch B11, the second operation branch B12, the third operation branch B12, the fourth operation branch B14, the first transient branch B21, the second transient branch B22, the third transient branch B23 and the fourth transient branch B24 to control their operation. By using a single controller C11, the control complexity can be reduced, and cost, footprint and volume of the MDCID 11 can be reduced as compared to the conventional MDCID 40.

In case that a fault occurring at first terminal between the first and fourth operation branches B11 and B14, the local controller C11 turns on the first transient branch B21 and at least one of the second, third and fourth transient branches B22-B24, and then starts to turn off the first and fourth operation branches B11 and B14, in succession or simultaneously. Upon completing turning-off of the first and fourth operation branches B11 and B14, the local controller C11 turns off the first transient branch B21 and at least one of the second, third and fourth transient branches B22-B24.

Specifically, the local controller C11 turn on the main breakers in the first transient branch B21 and at least one of the second, third and fourth transient branches B22-B24 to provide the transient DC current paths in the fault clearance mode, turn off the mechanical switches and the auxiliary breakers in the first and fourth operation branches B11 and B14 in response to turning on main breakers, and turn off the main breakers in first transient branch B21 and at least one of the second, third and fourth transient branches B22-B24 in response to completing the turning-off of the mechanical switches, and cause the energy absorption devices in first transient branch B21 and at least one of the second, third and fourth transient branches B22-B24 to absorb electric energy in response to turning off the main breakers. Scenarios of faults occurring at other terminals are similar to scenario of fault occurring at the first terminal due to symmetric topology, and the description is omitted here for brevity.

Due to the fact that at least two transient branches are employed for a fault at a terminal, main breakers and energy absorption devices in each transient branch can selected from main breakers and energy absorption devices of half performance, as compared to the transient branch in conventional MDCIDs. In other words, operation of the single transient branch in conventional MDCID is shared by two transient branches in configuration of FIG. 10. In this event, the transient branch in FIG. 10 is actually "half" of the transient branch in FIG. 2. This significantly reduces cost, volume and footprint, as compared to conventional approaches.

Figure 11:
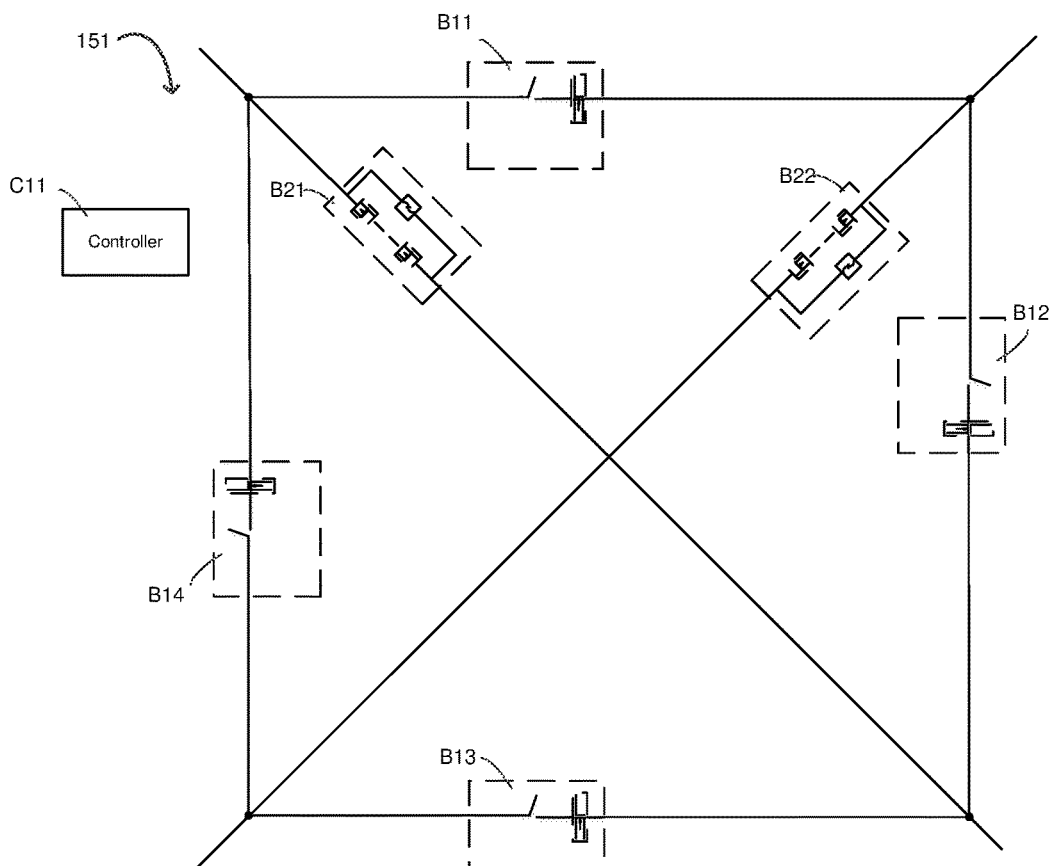
FIG. 11 illustrates a block diagram of a four-terminal MDCID in accordance with some example embodiments of the present disclosure.

FIG. 11 illustrates a block diagram of a four-terminal MDCID 151 in accordance with some example embodiments of the present disclosure. The MDCID 141 includes a first operation branch B11, a second operation branch B12, a third operation branch B13, a fourth operation branch B14, a first transient branch B21, a second transient branch B22 and a local controller C11. The MDCID 151 has a circular configuration with four operation branches connecting in a circle, and has a cross configuration with the first transient branch B21 coupled between the first and third terminals and the second transient branch B22 coupled between the second and fourth terminals.

The local controller C11 is coupled to (not shown for clarity) the first operation branch B11, the second operation branch B12, the third operation branch B12, the fourth operation branch B14, the first transient branch B21 and the second transient branch B22 to control their operation. By using a single controller C11, the control complexity can be reduced, and cost, footprint and volume of the MDCID 151 can be reduced as compared to the conventional MDCID 40.

In case that a fault occurring at the first terminal between the first and fourth operation branches B11 and B14, the local controller C11 turns on the first transient branch B21, and then starts to turn off the first and fourth operation branches B11 and B14, in succession or simultaneously. Upon completing turning-off of the first and fourth operation branches B11 and B14, the local controller C11 turns off the first transient branch B21.

In case that a fault occurring at the third terminal between the second and third operation branches B12 and B13, the local controller C11 turns on the first transient branch B21, and then starts to turn off the second and third operation branches B12 and B13, in succession or simultaneously. Upon completing turning-off of the second and third operation branches B12 and B13, the local controller C11 turns off the first transient branch B21.

Scenarios for fault occurred at the second and fourth terminals can be cleared in a similar manner as that to the fault occurred at the first and third terminals respectively, due to symmetric topology. With the configuration of FIG. 11, the transient branches can be reduced in half. This significantly reduces cost, volume and footprint, as compared to conventional approaches.

Figure 12:
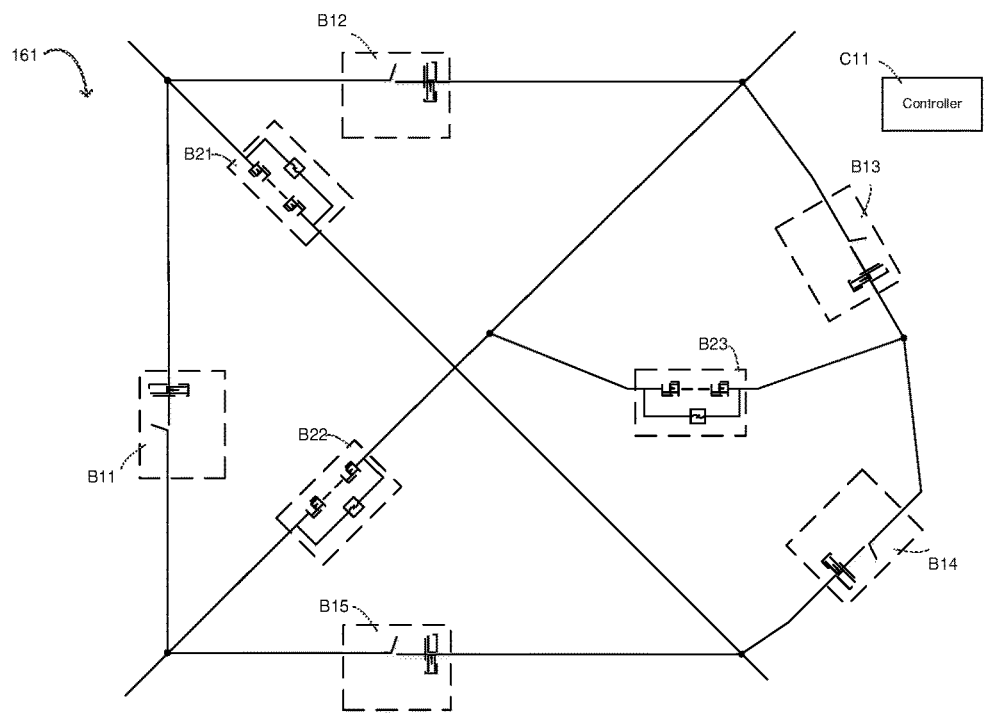
FIG. 12 illustrates a block diagram of a five-terminal MDCID in accordance with some example embodiments of the present disclosure.

FIG. 12 illustrates a block diagram of a five-terminal MDCID 161 in accordance with some example embodiments of the present disclosure. The MDCID 161 includes a first operation branch B11, a second operation branch B12, a third operation branch B13, a fourth operation branch B14, a fifth operation branch B15, a first transient branch B21, a second transient branch B22, a third transient branch B23 and a local controller C11. The MDCID 161 has a circular configuration with five operation branches connecting in a circle, and has the first transient branch B21 coupled between the first and fourth terminals, the second transient branch B22 coupled between the second and fifth terminals, and the third transient branch B23 coupled between the second and third terminals.

The local controller C11 is coupled to (not shown for clarity) the first operation branch B11, the second operation branch B12, the third operation branch B12, the fourth operation branch B14, the fifth operation branch B15, the first transient branch B21, the second transient branch B22 and the third transient branch B23 to control their operation. By using a single controller C11, the control complexity can be reduced, and cost, footprint and volume of the MDCID 161 can be reduced as compared to the conventional MDCID 40.

In case that a fault occurring at the first terminal between the first and second operation branches B11 and B12, the local controller C11 turns on the first transient branch B21, and then starts to turn off the first and second operation branches B11 and B12, in succession or simultaneously. Upon completing turning-off of the first and second operation branches B11 and B12, the local controller C11 turns off the first transient branch B21.

In case that a fault occurring at the second terminal between the second and third operation branches B12 and B13, the local controller C11 turns on at least one of the second and third transient branches B22 and B23, and then starts to turn off the second and third operation branches B12 and B13, in succession or simultaneously. Upon completing turning-off of the second and third operation branches B12 and B13, the local controller C11 turns off the at least one of the second and third transient branches B22 and B23.

In case that a fault occurring at the third terminal between the third and fourth operation branches B13 and B14, the local controller C11 turns on the third transient branch B23, and then starts to turn off the third and fourth operation branches B13 and B14, in succession or simultaneously. Upon completing turning-off of the third and fourth operation branches B13 and B14, the local controller C11 turns off the third transient branch B23. Although the third transient branch B23 is used here, this is only for illustration without suggesting any limitations as to the scope of the subject matter described here. For example, both the second and third transient branches B22 and B23 may be employed alternatively.

In case that a fault occurring at the fourth terminal between the fourth and fifth operation branches B14 and B15, the local controller C11 turns on the first transient branch B21, and then starts to turn off the fourth and fifth operation branches B14 and B15, in succession or simultaneously. Upon completing turning-off of the fourth and fifth operation branches B14 and B15, the local controller C11 turns off the first transient branch B21.

In case that a fault occurring at the fifth terminal between the fifth and first operation branches B15 and B11, the local controller C11 turns on the second transient branch B22, and then starts to turn off the fifth and first operation branches B15 and B11, in succession or simultaneously. Upon completing turning-off of the fifth and first operation branches B15 and B11, the local controller C11 turns off the second transient branch B22. Although the second transient branch B22 is used here, this is only for illustration without suggesting any limitations as to the scope of the subject matter described here. For example, both the second and third transient branches B22 and B23 may be employed alternatively.

With the configuration of FIG. 12, the transient branches can be shared by different operation branches. This significantly reduces cost, volume and footprint, as compared to conventional approaches. It can be understood that MDCIDs of more terminals can analogously reduce transient branches, as long as the transient branch is shared by the operation branches. For example, for configuration with N operation branches, it can have transient branches not greater than (N+1)/2, in which N represents an integer number of more than two.

To sum up, by multiplexing transient branches or sharing transient branches with different operation branches to create temporal DC path for operation branches, the embodiments herein can increase reliability of the MDCIDs due to simplified control logic for controlling less switches, and reduce cost, volume and footprint of the MDCIDs due to the fact that less semiconductor switches of high cost are used.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A modular direct current (DC) interconnection device, comprising:
   at least three operation branches each including a mechanical switch, an auxiliary breaker serially coupled with the mechanical switch, and a first terminal coupled to a common node and configured to transmit DC current in a normal mode;
   at least one transient branch including a main breaker and an energy absorption device coupled in parallel to the main breaker, the at least one transient branch coupled between second terminals of different ones of the at least three operation branches and configured to provide a transient DC current path in a fault clearance mode; and
   a local controller coupled to the at least three operation branches and the at least one transient branch and configured to control operation of the at least three operation branches and the at least one transient branch;
   wherein the local controller is further configured to:
   receive fault clearance information, from a local controller of another modular DC interconnection device (MDCID), a global controller, or a sensor for sensing a fault in a modular interconnection device (MID) or the MDCID and determine operation and transient branches associated with fault clearance operation in the fault clearance mode based on the received fault clearance information,
   turn on the main breaker in the determined transient branch to provide the transient DC current path in the fault clearance mode between the two second terminals of the determined operation branch and another operation branch of the at least three operation branches,
   turn off the mechanical switch and the auxiliary breaker in the determined operation branch in response to turning on main breaker turn off the main breaker in the determined transient branch in response to completing a turning-off of the mechanical switch, and
   cause the energy absorption device in the determined transient branch to absorb electric energy in response to turning off the main breaker.

2. The modular DC interconnection device of claim 1, wherein the at least three operation branches comprise:
   a first operation branch including a first terminal coupled to the common node,
   a second operation branch including a first terminal coupled to the common node, and
   a third operation branch including a first terminal coupled to the common node;
   wherein the at least one transient branch comprises a first transient branch coupled between second terminals of the first operation branch and the second operation branch.

3. The modular DC interconnection device of claim 2, wherein the local controller is further configured to:
   turn on the first transient branch to transmit DC current,
   turn off the first operation branch in response to turning on the first transient branch, and
   turn off the first transient branch in response to completing a turning-off of the first operation branch.

4. The modular DC interconnection device of claim 1, wherein the at least three operation branches comprise:
   a first operation branch including a first terminal coupled to the common node,
   a second operation branch including a first terminal coupled to the common node, and
   a third operation branch including a first terminal coupled to the common node;
   wherein the at least one transient branch comprises:
   a first transient branch coupled between second terminals of the first operation branch and the second operation branch, and
   a second transient branch coupled between second terminals of the second operation branch and the third operation branch.

5. The modular DC interconnection device of claim 4, wherein the local controller is further configured to:
   turn on the first transient branch to transmit DC current,
   turn off the first operation branch in response to turning on the first transient branch, and
   turn off the first transient branch in response to completing a turning-off of the first operation branch.

6. The modular DC interconnection device of claim 4, wherein the local controller is further configured to:
   turn on at least one of the first and second transient branches to transmit DC current,
   turn off the second operation branch in response to turning on the at least one of the first and second transient branches, and
   turn off the at least one of the first and second transient branches in response to completing a turning-off of the second operation branch.

7. The modular DC interconnection device of claim 1, wherein the at least three operation branches comprise:
- a first operation branch including a first terminal coupled to the common node,
- a second operation branch including a first terminal coupled to the common node,
- a third operation branch including a first terminal coupled to the common node, and
- a fourth operation branch including a first terminal coupled to the common node;

wherein the at least one transient branch comprises:
- a first transient branch coupled between second terminals of the first operation branch and the second operation branch, and
- a second transient branch coupled between second terminals of the third operation branch and the fourth operation branch.

8. The modular DC interconnection device of claim 1, wherein the at least three operation branches comprise:
- a first operation branch including a first terminal coupled to the common node,
- a second operation branch including a first terminal coupled to the common node,
- a third operation branch including a first terminal coupled to the common node,
- a fourth operation branch including a first terminal coupled to the common node, and
- a fifth operation branch including a first terminal coupled to the common node;

wherein the at least one transient branch comprises:
- a first transient branch coupled between second terminals of the first operation branch and the second operation branch,
- a second transient branch coupled between second terminals of the second operation branch and the third operation branch, and
- a third transient branch coupled between second terminals of the fourth operation branch and the fifth operation branch.

9. The modular DC interconnection device of claim 1, wherein the main breaker comprises a plurality of insulated gate bipolar transistors (IGBTs) coupled in series.

10. The modular DC interconnection device of claim 1, wherein completing the turning-off of the mechanical switch comprises separating first and second contacts of the mechanical switch by a predetermined distance.

11. The modular DC interconnection device of claim 1, wherein a number of the at least one transient branch is not greater than half of a sum of a number of the at least three operation branches and one.

12. An electrical network system, comprising:
- a first interconnection device;
- a second interconnection device,
  - wherein the second interconnection device is selectively coupled to the first interconnection device;
- a third interconnection device,
  - wherein the third interconnection device is selectively coupled to the first interconnection device and the second interconnection device, and
  - the third interconnection device is configured to transmit DC current among the first, second, and third interconnection devices;
- wherein each of the first, second, and third interconnection devices includes the modular DC interconnection device of claim 1;
- and the global controller configured to communicate with local controllers of the first, second, and third interconnection devices.

13. The electrical network system of claim 12, wherein the at least three operation branches in the modular DC interconnection device of the first interconnection device comprise:
- a first operation branch including a first terminal coupled to the common node,
- a second operation branch including a first terminal coupled to the common node, and
- a third operation branch including a first terminal coupled to the common node;

wherein the at least one transient branch in the modular DC interconnection device of the first interconnection device comprises:
- a first transient branch coupled between second terminals of the first operation branch and the second operation branch.

14. The electrical network system of claim 13, wherein the local controller in the modular DC interconnection device of the first interconnection device is further configured to:
- turn on the first transient branch to transmit DC current,
- turn off the first operation branch in response to turning on the first transient branch, and
- turn off the first transient branch in response to completing a turning-off of the first operation branch.

* * * * *